J. T. SWAN.
FRUIT GATHERER.
APPLICATION FILED JAN. 21, 1909.
925,248.
Patented June 15, 1909.
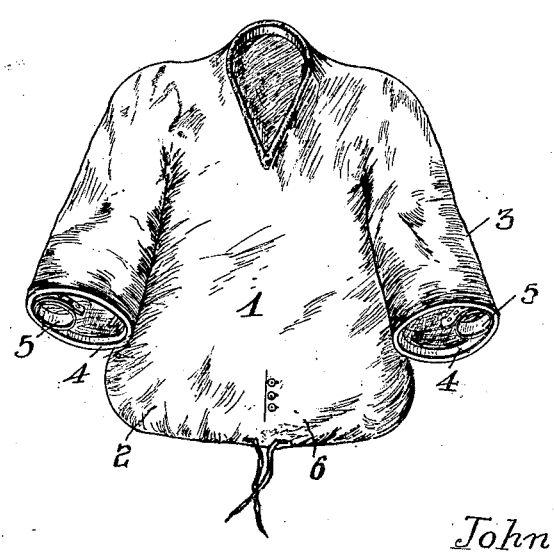
Witnesses
Inventor
John T. Swan.
by
Attorneys

UNITED STATES PATENT OFFICE.

JOHN THOMAS SWAN, OF AUBURN, NEBRASKA.

FRUIT-GATHERER.

No. 925,248.  Specification of Letters Patent.  Patented June 15, 1909.

Application filed January 21, 1909. Serial No. 473,430.

*To all whom it may concern:*

Be it known that I, JOHN THOMAS SWAN, a citizen of the United States, residing at Auburn, in the county of Nemaha and State of Nebraska, have invented certain new and useful Improvements in Fruit-Gatherers; and I do declare the following to be a full, clear, and exact description of the invention, such as will enable others skilled in the art to which it appertains to make and use the same.

This invention relates to improvements in fruit gatherers.

The object of the invention is to provide a fruit gatherer having a receptacle constructed in the form of a garment to be worn by the person who is picking the fruit.

A further object is to provide a device of this character in which the sleeves of the garment form conveyers or chutes into which the fruit is dropped and conveyed to the receptacle without bruising.

With the foregoing and other objects in view, the invention consists of certain novel features of construction, combination and arrangement of parts, as will be more fully described and particularly pointed out in the appended claims.

In the accompanying drawings:—Figure 1 is a view showing the application and manner of using the device. Fig. 2 is a perspective view of the gatherer, and Fig. 3 is a perspective view of another form of the device.

My improved fruit gatherer, as shown in Figs. 1 and 2 is in the form of a shirt waist 1, the body of which at its lower portion is made very full, to provide a receptacle 2. The lower edge of the body portion of the waist is turned in and tied, or otherwise tightly secured around the waist of the person using the same. The upper portion fits the shoulders of the wearer like a shirt or coat; the sleeves, 3, are made large and are adapted to serve as chutes or conveyers into the outer open end of which the fruit is dropped as the same is picked. The fruit, after being dropped into the end of the sleeve, rolls down the same into the body portion or receptacle of the gatherer, without being bruised. The outer ends of the sleeves are held open by a ring or band, 4, or other suitable holding device, and the ring is supported and the sleeve held up when the arm is raised by a strap or cord, 5, fastened around the wrist or hand. At any suitable place in the lower portion of the receptacle is formed an opening, 6, through which the fruit is discharged. The opening, 6, may be closed by buttons or other suitable fastening devices.

In Fig. 3, of the drawings is shown a modified form of the sleeve. The sleeve 10 as shown in Fig. 3 is provided with an extension 12 connected to its inner end and forming a chute or conduit to conduct the fruit to a receptacle 13 which may be of any suitable construction and is here shown as a bag carried by the person picking the fruit.

By means of a fruit gatherer constructed and arranged for use as herein shown and described all kinds of fruit may be quickly and easily gathered without being bruised or injured.

From the foregoing description, taken in connection with the accompanying drawings, the construction and operation of the invention will be readily understood without requiring a more extended explanation.

Various changes in the form, proportion and the minor details of construction, may be resorted to without departing from the principles or sacrificing any of the advantages of the invention as defined in the appended claims.

Having thus described my invention, what I claim and desire to secure by Letters-Patent is:

1. A fruit gatherer constructed in the form of a garment adapted to be worn and to be drawn in and secured to the body of the wearer around the waist-line to form a receptacle, sleeves arranged in said garment and constructed to form chutes communicating at their inner ends with said receptacle and means to hold the outer ends open and means to support said ends in position to receive the picked fruit.

2. A blouse-like coat having relatively large sleeves, means to hold the mouth thereof distended, and means for holding the wearer's wrist eccentric within the mouth of the sleeve.

3. A blouse-like coat having relatively large sleeves, means to hold the mouth of said sleeves distended, and means carried by the distending means to hold the operator's wrist eccentric within the mouth of the sleeve.

4. A device of the class described comprising a blouse like coat, means for drawing the skirts of the coat around the wearer to form a receptacle, sleeves attached to said coat and adapted to form chutes leading to said receptacle, means to hold the mouth of said sleeves distended, and means to hold
5 the wearer's wrist eccentric within the sleeves, whereby the chutes will be unobstructed.

In testimony whereof I have hereunto set my hand in presence of two subscribing witnesses.

JOHN THOMAS SWAN.

Witnesses:
WILLIAM H. McKENNEY,
BENJAMIN F. DILLARD.